May 17, 1932.  V. M. OREAR  1,859,046
PROCESS OF FORMING ICE CREAM CONES
Filed April 2, 1930
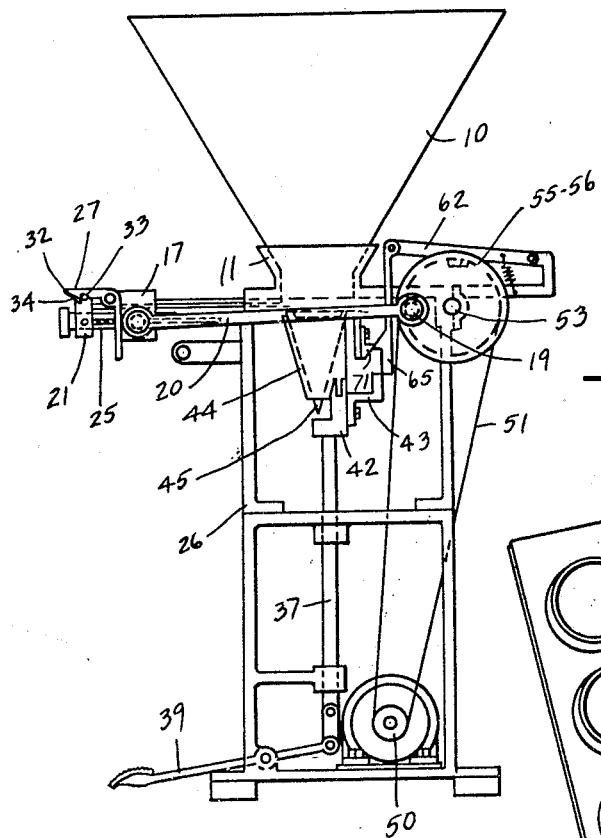
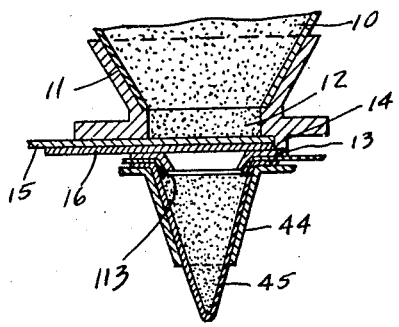
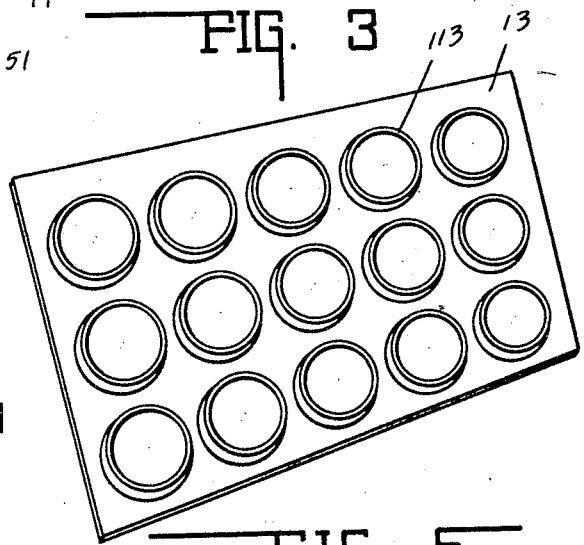
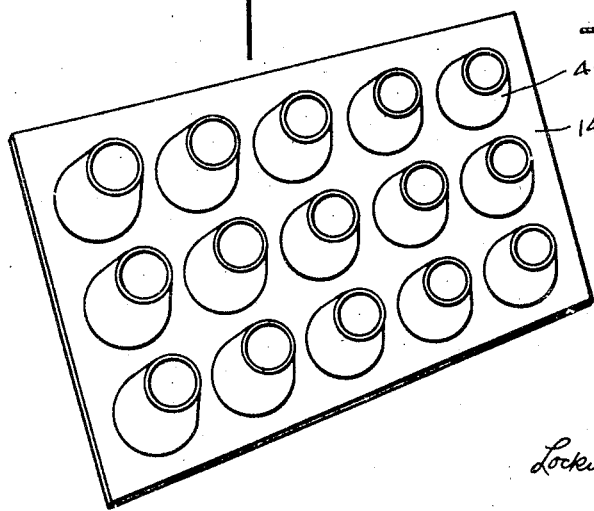
INVENTOR.
VINCENT M. OREAR.
BY
Lockwood Lockwood Goldsmith & Galt
ATTORNEYS.

Patented May 17, 1932

1,859,046

UNITED STATES PATENT OFFICE

VINCENT M. OREAR, OF EVANSVILLE, INDIANA, ASSIGNOR, BY MESNE ASSIGNMENTS, TO ARDEE PATENTS CORPORATION, OF EVANSVILLE, INDIANA

PROCESS OF FORMING ICE CREAM CONES

Application filed April 2, 1930. Serial No. 440,925.

This invention relates to the process of forming a plastic mix into a predetermined form and the sanitary packaging thereof.

The chief object of this invention is to form into a predetermined form a plastic compressible material and of a predetermined amount and associate the same with a form conforming non-sustaining coating or covering of a sanitary character which may be readily discarded and which is relatively inexpensive.

The chief feature of the invention consists in providing a form conforming non-sustaining covering for a plastic material and sustaining said covering while the material is in a plastic state until it solidifies or hardens whereupon the sustaining form may be removed and the material retained within the covering until used.

A coating or covering having insufficient strength to sustain the nonsolidified mix is intended to be included in the terminology nonform sustaining employed in the following description and claim and this covering may be of that general character known in the dairy industry as thin parchment paper.

The full nature of the invention will be understood from the accompanying drawings and the following description and claim:

In the drawings Fig. 1 is a side elevation of a filling machine suitable for practicing the first step of the process.

Fig. 2 is an enlarged central sectional view showing the first step of the process.

Fig. 3 is a perspective bottom plan view of the guide plate and article covering retainer.

Fig. 4 is a similar view of the form or mold receiving the covering and sustaining the same and the plastic mix during the filling, the cutting off and the solidifying or hardening of the material.

Fig. 5 illustrates the step of the process subsequent to the hardening or solidifying of the mix and the separation of the covered product from the sustaining mold.

The machine illustrated in Fig. 1 is the subject matter of a co-pending application No. 430,248 filed February 21, 1930, entitled Redi-dip machine, as set forth in the before mentioned application. The present method of forming cones, sundaes and the like, does not insure to the retailer of bulk ice cream a predetermined profit, because of the difference in the amount of mass that each dipping accumulates and this is due to the packing or compressing of the mass since ice cream is approximately 50% air.

Another object accomplished by the present invention is the elimination of the unsanitary use of dippers and other similar mechanism now employed in dispensing cones and in the making of edible coated ice cream bodies by the retailer. The present practice is to form cones by using a dipper or like instrument, dipping the same into bulk ice cream to fill the dipper and then discharging the collected mass into a form that is edible, usually a bakery product. Edible coated ice cream bodies are formed by using the dipper to form the bulk of the body and then inserting a handle support into the bulk of the body, removing it from the dipper, then immersing the body in an edible coating in liquid form and then freezing the coating or solidifying it upon the solid body.

The present invention contemplates the employment of the coating or wrapper having little but no ability to retain a particular form and certainly not act as a retainer or mold, with a plastic mix while the retainer is positioned in a mold, then solidifying the plastic mix while in the retainer and in the mold and when solidified removing the mold and then packaging for dispensing or shipping when desired.

In the drawings 10 indicates a hopper supported by a truncated mouth or frame 11 provided with a discharge orifice 12. A plate 13 having a suitable number of frusto-conical throats 113, is provided. The base 11 includes a passage way 14 which slidably receives a cut-off plate 15 and the smoothing blade 16. Said blades are actuated by the reciprocating rod 20 connected to a crosshead 17 and the two plates have relative movement through the mechanism indicated at 21, 27, 32 and 34. The power may be derived from spring 25. The frame 26 of the machine supports a foot pedal control 39 which serves to raise and lower the standard 37 supporting the movable base 42, which in turn detachably supports the mold construction 44. The base 42 includes a control cam 43 associated with a control rod 65 and cam 71. Power for motor 50, which continuously rotates, through the endless drive 51 is transmitted to shaft 53 through a clutch mechanism 55—56 controlled by the lever 62 so that the operation of the machine is substantially as follows.

Upon elevation of the form or mold 44 into registration with the guide plate 13, the clutch is operated to cause one rotation of eccentric 19 connected to the rod 20 which causes one reciprocation of the plates, the reciprocation into the channel 14 occurring at the time that the nonform sustaining covering 45 is filled. Cut-off plate at the end of its cutting off stroke is arranged to release the smoothing blade which is retracted by the power spring 25 previously loaded by the forward cutting off movement so that the top of the mix is smoothed and passes through the throat 113 of plate 13 when the form 44 is lowered by releasing the pressure applied to the treadle 39. When the pressure is released the form 44 is removed with all of the compartments therein filled with the plastic mix, said mix being retained in the open ended form by the nonform sustaining retainer or coating 45.

In Figs. 3 and 4 there are illustrated a guide plate and a form plate respectively each of which is provided with a plurality of parallel rows with a plurality of forms in each row. The tray 144 or connecting portion between the forms 44 together with the same may then be taken from the support 42, passed to a hardening room where the plastic mix is hardened or solidified in its jacket.

After it has solidified sufficiently, the plastic mix indicated at 9 is self sustaining whereupon the tray 144 may be inverted, see Fig. 5, and the solidified bodies 9 in their retainers 45 are detached by tapping on the plate 144 or the like. The mold is then ready for refilling.

By the aforesaid process it will be noted that no human hand is necessary to engage the article and if desired, machinery may be employed for mechanically supplying the coatings or coverings 45 to the forms 44. It has been determined that by reason of the economy effected through the packaging of a predetermined bulk of the ice cream in small units that the so-called packing or bulking loss that is encountered in the present customary dispensing of bulk ice cream is entirely eliminated and the saving effected is sufficient to pay for the costs of forming the individual objects and to pay the cost of the wrapper which encloses the same.

The invention claimed is:

A process of forming a sanitary dispensable ice cream cone for individual consumption, comprising supplying to a pressure sustaining form a covering generally conforming to the shape thereof and of insufficient rigidity itself to sustain a normally free flowing semi-frozen ice cream mix at ordinary temperatures, supplying a measured quantity of the ice cream mix to the covering while in the form, solidifying the ice cream mix in the covering while sustained by the form, then removing the frozen ice cream mix and its covering from the form, and maintaining the form of said commodity by keeping said frozen ice cream mix below ordinary temperatures until dispensed for immediate consumption, the covering protecting the edible mix during consumption.

In witness whereof, I have hereunto affixed my signature.

VINCENT M. OREAR.